US010120196B2

(12) United States Patent
Jeng et al.

(10) Patent No.: US 10,120,196 B2
(45) Date of Patent: Nov. 6, 2018

(54) OPTICAL DEVICE

(71) Applicant: National Taiwan University of Science and Technology, Taipei (TW)

(72) Inventors: Jeng-Ywan Jeng, Taipei (TW); Mohammad Hossein Goudarzi Khouygani, Taipei (TW); Chyan-Chyi Wu, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 24 days.

(21) Appl. No.: 15/281,099

(22) Filed: Sep. 30, 2016

(65) Prior Publication Data
US 2018/0095287 A1 Apr. 5, 2018

(51) Int. Cl.
*G01B 9/02* (2006.01)
*G02B 27/14* (2006.01)
*G02B 27/42* (2006.01)
*G01C 3/00* (2006.01)
*G01B 11/02* (2006.01)
*G02B 5/04* (2006.01)

(52) U.S. Cl.
CPC ............ *G02B 27/14* (2013.01); *G01B 11/026* (2013.01); *G01C 3/00* (2013.01); *G02B 27/4233* (2013.01); *G02B 5/04* (2013.01)

(58) Field of Classification Search
CPC ...... G02B 27/14; G02B 27/4233; G02B 5/04; G01B 11/002; G01B 11/02; G01B 11/14; G01B 9/02; G01B 9/02019; G01B 9/02061; G01D 5/266; G01D 5/34715; G03F 7/70775; G03F 7/7049

USPC .................................................. 356/498, 499
See application file for complete search history.

(56) References Cited

U.S. PATENT DOCUMENTS

| 4,585,349 A | 4/1986 | Gross et al. |
| 5,000,542 A | 3/1991 | Nishimura et al. |
| 5,098,190 A | 3/1992 | Wijntjes et al. |

(Continued)

FOREIGN PATENT DOCUMENTS

| JP | 2013068523 A | 4/2013 |
| JP | 2014115242 A | 6/2014 |

(Continued)

*Primary Examiner* — Tarifur R Chowdhury
*Assistant Examiner* — Jonathon Cook
(74) *Attorney, Agent, or Firm* — CKC & Partners Co., Ltd.

(57) ABSTRACT

An optical device for measuring a distance includes a prism, a beam splitter, a detector and a light source. The prism has a first light-incident surface and a plurality of first light-transmitting surfaces. The first light-incident surface is opposite to the first light-transmitting surfaces. The first light-transmitting surfaces intersect at a vertex. The beam splitter has a light-passing surface, a second light-incident surface and a second light-transmitting surface. The second light-incident surface faces the first light-transmitting surfaces. The light-passing surface is opposite to the second light-incident surface. The beam splitter includes a partially mirror surface facing the light-passing surface and the second light-incident surface. The light-passing surface faces a grating. The detector corresponds to the second light-transmitting surface. The light source emits a light beam to the first light-incident surface. An optical axis of the light beam passes through the vertex and the beam splitter.

14 Claims, 3 Drawing Sheets

(56) References Cited

U.S. PATENT DOCUMENTS

| | | | | |
|---|---|---|---|---|
| 5,703,684 A | * | 12/1997 | Lu | G01B 11/14 |
| | | | | 356/507 |
| 2011/0255096 A1 | * | 10/2011 | Deck | G01D 5/38 |
| | | | | 356/488 |

FOREIGN PATENT DOCUMENTS

| | | |
|---|---|---|
| TW | I294228 B | 3/2008 |
| TW | I435067 B | 4/2014 |

* cited by examiner

OPTICAL DEVICE

BACKGROUND

Technical Field

The present disclosure relates to an optical device. More particularly, the present disclosure relates to an optical device utilized for measuring distances.

Description of Related Art

With the rapid development of high technology industry, the demand for positioning systems in the scale of micrometers and nanometers has been increasing. In addition, the demand for the precision of the optical scales has been relatively increasing as well. Furthermore, the application of optical scales has become more popular.

Therefore, apart from increasing the precision of the optical scales, the effective reduction for the production cost of the optical scales is no doubt an important issue in the industry.

SUMMARY

A technical aspect of the present disclosure provides an optical device which can effectively reduce the overall cost.

According to an embodiment of the present disclosure, an optical device is configured for measuring a distance. The optical device includes a prism, a beam splitter, a detector and a light source. The prism has a first light-incident surface and a plurality of first light-transmitting surfaces. The first light-incident surface is disposed opposite to the first light-transmitting surfaces. The first light-transmitting surfaces are mutually connected and intersect at a vertex. The beam splitter has a light-passing surface, and a second light-incident surface and a second light-transmitting surface mutually connected. The second light-incident surface at least partially faces to the first light-transmitting surfaces. The light-passing surface is disposed opposite to the second light-incident surface. The beam splitter further includes a partially mirror surface therein. The partially mirror surface at least partially faces to the light-passing surface and the second light-incident surface. The light-passing surface is configured to face to a grating. The detector corresponds to the second light-transmitting surface. The light source is configured to emit a light beam to the first light-incident surface. An optical axis of the light beam passes through the vertex and the beam splitter.

In one or more embodiments of the present disclosure, the vertex is away from the light source.

In one or more embodiments of the present disclosure, each of the first light-transmitting surfaces is substantially a flat surface.

In one or more embodiments of the present disclosure, the light source, the vertex and the beam splitter are substantially aligned in a straight line.

In one or more embodiments of the present disclosure, the first light-incident surface includes a plurality of subsidiary light-incident surfaces. The subsidiary light-incident surfaces are mutually connected and intersect at a recessed angle less than 180 degree outside the prism.

In one or more embodiments of the present disclosure, the subsidiary light-incident surfaces form together a recessed shape and the first light-transmitting surfaces form together a protruding shape, such that the prism is in a V shape.

In one or more embodiments of the present disclosure, the first light-incident surface includes a plurality of subsidiary light-incident surfaces. The subsidiary light-incident surfaces are mutually connected and intersect at a protruding angle more than 180 degree outside the prism.

In one or more embodiments of the present disclosure, the subsidiary light-incident surfaces form together a protruding shape and the first light-transmitting surfaces form together a recessed shape, such that the prism is in a Δ shape.

In one or more embodiments of the present disclosure, the second light-transmitting surface and the light-passing surface are mutually connected.

In one or more embodiments of the present disclosure, the prism includes a transparent material against the light beam.

In one or more embodiments of the present disclosure, the light source is configured to emit a coherent light.

In one or more embodiments of the present disclosure, the first light-transmitting surfaces are configured to refract the light beam, such that an angle between the light beams after refracted by each of the first light-transmitting surfaces is equal to an integer multiple of a ratio of a wavelength of the light beam to a pitch of the grating.

When compared with the prior art, the above-mentioned embodiments of the present disclosure have at least the following advantages:

(1) Since each of the first light-transmitting surfaces of the prism is substantially a flat surface, and the first light-incident surface can include a plurality of subsidiary light-incident surfaces, in which the subsidiary light-incident surfaces are mutually connected and intersect at the recessed angle less than 180 degree outside the prism, as compared with a lens with a curved light-incident surface and a curved light-transmitting surface, the structure of the prism is simple and is easy to be manufactured. Furthermore, the prism can include a transparent material against the light beam, such as acrylic. Thus, the production cost of the prism can be reduced. Consequently, the overall cost of the optical device can be effectively reduced.

(2) Because of the simple structure of the prism, the installation and adjustment of the prism in the optical device becomes simple and easy. Thus, the overall cost of the optical device is further reduced effectively.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
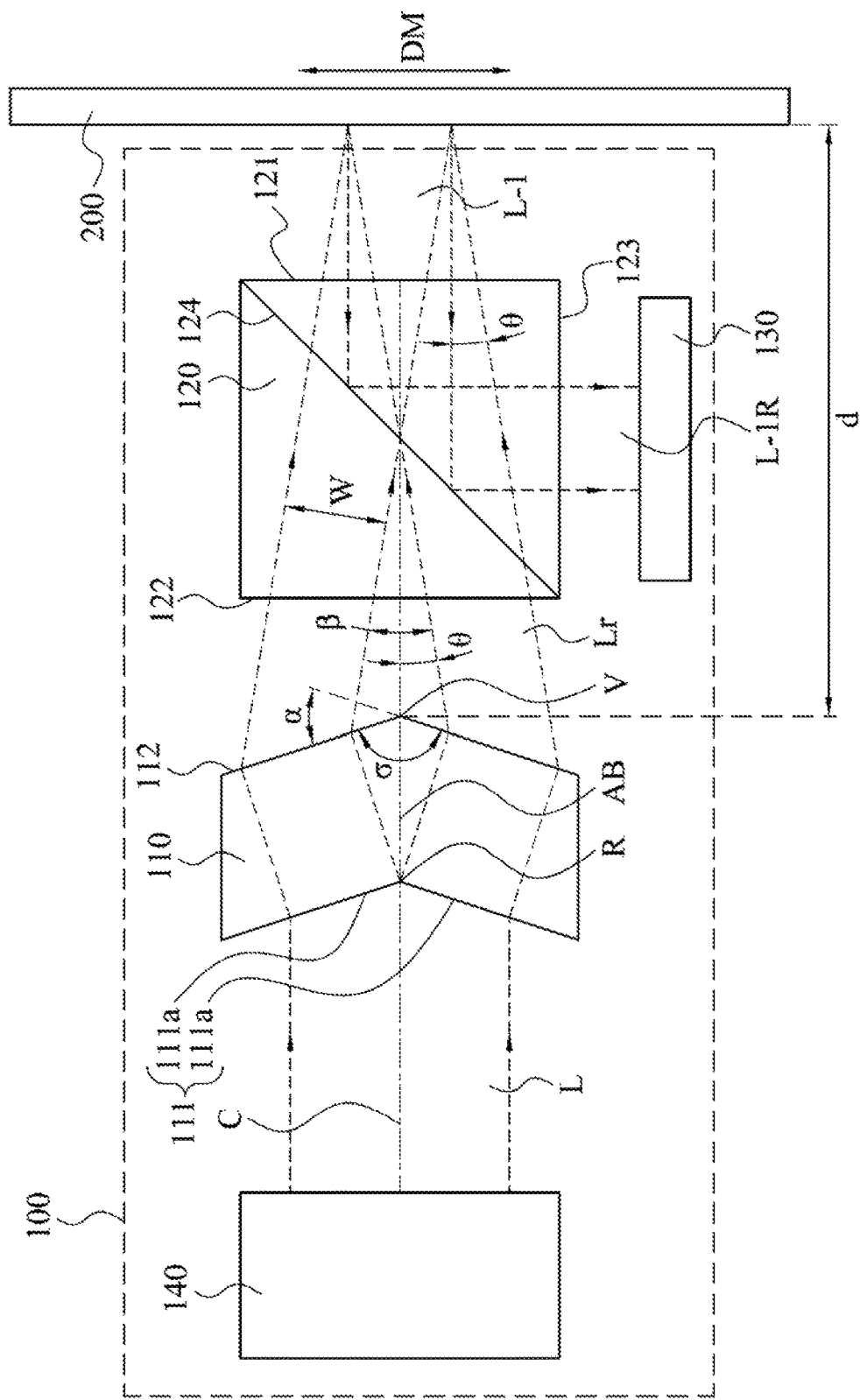
FIG. 1 is a schematic diagram of an optical device according to an embodiment of the present disclosure.

Drawings will be used below to disclose embodiments of the present disclosure. For the sake of clear illustration, many practical details will be explained together in the description below. However, it is appreciated that the practical details should not be used to limit the claimed scope. In other words, in some embodiments of the present disclosure, the practical details are not essential. Moreover, for the sake of drawing simplification, some customary structures and elements in the drawings will be schematically shown in a simplified way. Wherever possible, the same reference numbers are used in the drawings and the description to refer to the same or like parts.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Reference is made to FIG. 1. FIG. 1 is a schematic diagram of an optical device 100 according to an embodiment of the present disclosure. As shown in FIG. 1, an optical device 100 configured for measuring a distance is provided. The optical device 100 includes a prism 110, a beam splitter 120, a detector 130 and a light source 140. The prism 110 has a first light-incident surface 111 and a plurality of first light-transmitting surfaces 112. The first light-incident surface 111 is disposed opposite to the first light-transmitting surfaces 112. The first light-transmitting surfaces 112 are mutually connected and intersect at a vertex V. In this embodiment, the vertex V is an obtuse angle inside the prism 110. The beam splitter 120 has a light-passing surface 121, and a second light-incident surface 122 and a second light-transmitting surface 123 mutually connected. The second light-incident surface 122 at least partially faces to the first light-transmitting surfaces 112. The light-passing surface 121 is disposed opposite to the second light-incident surface 122. The beam splitter 120 further includes a partially mirror surface 124 therein. The partially mirror surface 124 at least partially faces to the light-passing surface 121 and the second light-incident surface 123. The light-passing surface 121 is configured to face to a grating 200. The detector 130 corresponds to the second light-transmitting surface 123. The light source 140 is configured to emit a light beam L to the first light-incident surface 111. An optical axis C of the light beam L passes through the vertex V of the prism 110 and the beam splitter 120. In practical applications, the light source 140, the vertex V of the prism 110 and the beam splitter 120 are substantially aligned in a straight line.

To be specific, after the light source 140 emits the light beam L to the first light-incident surface 111 of the prism 110, the light beam L enters into the prism 110. Since the first light-transmitting surfaces 112 of the prism 110 are mutually connected and intersect at the vertex V, and the vertex V is an obtuse angle inside the prism 110 as mentioned above, in other words, the first light-transmitting surfaces 112 form together an angle σ inside the prism 110, thus the route of the light beam L as emitted from the light source 140 is not the same as the corresponding normal of each of the first light-transmitting surfaces 112. As a result, the light beam L is refracted by the light-transmitting surfaces 112 and is separated to form two independent light beams Lr as shown in FIG. 1. Moreover, each of the light beams Lr forms an angle θ with the optical axis C. In practice, the angle θ depends on the wavelength of the light beam L.

To be more specific, when the position of the prism 110 is set such that the angle bisector AB of the angle σ overlaps with the optical axis C of the light beam L, the two light beams Lr separated will have the same width W. Moreover, when the angle bisector AB of the angle σ overlaps with the optical axis C of the light beam L, the optical axis C also becomes the symmetrical line of the prism 110.

Afterwards, the light beams Lr with the same width W pass through the second light-incident surface 122 of the beam splitter 120 and enter into the beam splitter 120. The light beams Lr entering into the beam splitter 120 at least partially pass through the partially mirror surface 124 located inside the beam splitter 120, and then leave the beam splitter 120 through the light-passing surface 121, and reach the grating 200 consequently. By adjusting the distance d between the vertex V of the prism 110 and the grating 200, the positions that the two light beam Lr reaching the grating 200 can be adjusted to become mutually overlapped.

Technically speaking, through the design of the magnitude of the angle σ, i.e., through the design of the magnitude of the angle α as shown in FIG. 1 (the sum of angle σ and angle α is 180 degree), the light beams Lr as refracted from the prism 110 will respectively reach the grating 200 in the angle θ.

In this embodiment, with reference to the microstructure (for instance, in the magnitude of nanometers) on the surface of the grating 200, the angle α of the prism 110 is calculated, such that the n-th order diffracted light beam Ln (not shown in FIG. 1) as produced due to the diffraction of the light beams Lr by the grating 200 can be projected to the light-passing surface 121 of the beam splitter 120 in a direction substantially perpendicular to the surface of the grating 200. Mathematically speaking, the angle θ can be determined by the following equation:

$$\theta = m\Delta/2d$$

where m=an integer except zero,
Δ=wavelength of the light beam Lr, and
d=pitch of the grating 200.

For example, as illustrated by the −1st order (negatively first order) diffracted light beams L−1 (i.e., n=−1), as shown in FIG. 1, when the angle α of the prism 110 is calculated and the light beams Lr as refracted from the prism 110 pass though the beam splitter 120 and reach the grating 200 as mentioned above, the light beams Lr are diffracted by the grating 200, and the −1st order diffracted light beams L−1 can be projected to the light-passing surface 121 of the beam splitter 120 in a direction substantially perpendicular to the surface of the grating 200 while interfering with each other. In other words, for the two light beams Lr as separated and formed by the prism 110, the two −1st order diffracted light beams L−1 respectively produced due to the diffraction by the grating 200 are mutually interfered and are projected to the light-passing surface 121 of the beam splitter 120 in a direction substantially perpendicular to the surface of the grating 200 in an overlapping manner.

In addition, the two mutually interfered −1st order diffracted light beams L−1 projected to the light-passing surface 121 of the beam splitter 120 in an overlapping manner will be at least partially reflected by the partially mirror surface 124 located in the beam splitter 120 after passing through the light-passing surface 121, such that mutually interfered light beams L−1R are formed and projected to the second light-transmitting surface 123. Consequently, the two mutually interfered and overlapped light beams L−1R pass through the second light-transmitting surface 123 and are detected by the detector 130. In this embodiment, the second light-transmitting surface 123 and the light-passing surface 121 are mutually connected. Moreover, the detector 130 is able to detect the intensity of the two mutually interfered light beams L−1R.

Since the detector 130 can detect the intensity of the two mutually interfered light beams L–1R, and the change of the intensity of the mutually interfered light beams L–1R because of the movement of the microstructure on the surface of the grating 200, by detecting the change of the intensity of the two mutually interfered light beams L–1R, the distance that the grating 200 is moved relative to the optical device 100 in the moving direction DM, i.e., the distance that the optical device 100 is moved relative to the grating 200 in the moving direction DM, can be accurately obtained under the condition that the distance d remains constant.

To be more specific, the first light-transmitting surfaces 112 of the prism 110 are configured to refract the light beam L to become the light beams Lr, such that an angle β between the light beams Lr after refracted by the first light-transmitting surfaces 112 is equal to an integer multiple of a ratio of a wavelength of the light beam Lr to a pitch of the grating 200. In this way, it can be guaranteed that the diffracted orders of the light beams Lr after hitting the grating 200 can interfere together and then form a common path. In this embodiment, as shown in FIG. 1, the angle β is substantially equal to twice the angle θ because the optical axis C also becomes the symmetrical line of the prism 110 as mentioned above. However, this does not intend to limit the present disclosure. For example, in other embodiments, the prism 100 can be of an asymmetric structure, and the angle β is not equal to twice the angle θ anymore.

In this embodiment, since each of the first light-transmitting surfaces 112 of the prism 110 is substantially a flat surface, and the first light-incident surface 111 can include a plurality of subsidiary light-incident surfaces 111a, in which the subsidiary light-incident surfaces 111a are mutually connected and intersect at a recessed angle R less than 180 degree outside the prism 110, as compared with a lens with a curved light-incident surface and a curved light-transmitting surface, the structure of the prism 110 is simple and is easy to be manufactured. Furthermore, the prism 110 can include a transparent material against the light beam L, such as poly(methyl methacrylate) (PMMA), which is also known as acrylic. Thus, the production cost of the prism 110 can be reduced. Consequently, the overall cost of the optical device 100 can be effectively reduced.

To be more specific, the first light-transmitting surfaces 112 are mutually connected and the vertex V as intersected forms an obtuse angle inside the prism 110, i.e., larger than 90 degree, such that the first light-transmitting surfaces 112 form together a protruding shape. Meanwhile, the subsidiary light-incident surfaces 111a are mutually connected and the recessed angle R as intersected is also an obtuse angle outside the prism 110, such that the subsidiary light-incident surfaces 111a form together a recessed shape. Therefore, the prism 110 is in a V shape. In addition, the vertex V is disposed to be away from the light source 140.

On the other hand, because of the simple structure of the prism 110, the installation and adjustment of the prism 110 in the optical device 110 becomes simple and easy. Thus, the overall cost of the optical device 100 is further reduced effectively.

It should be noted that the detector 130 can accurately detect the intensity of the two mutually interfered light beams L–1R. The light source 140 is configured to emit a coherent light or any type of light which can be separated and mutually interfered. The coherent light is a light with a single frequency and with the waves in phase. In this embodiment, for example, the light beam that the light source 140 emits can be a laser beam or a light beam as emitted by a light-emitting diode. However, this does not intend to limit the present disclosure.

Figure 2:
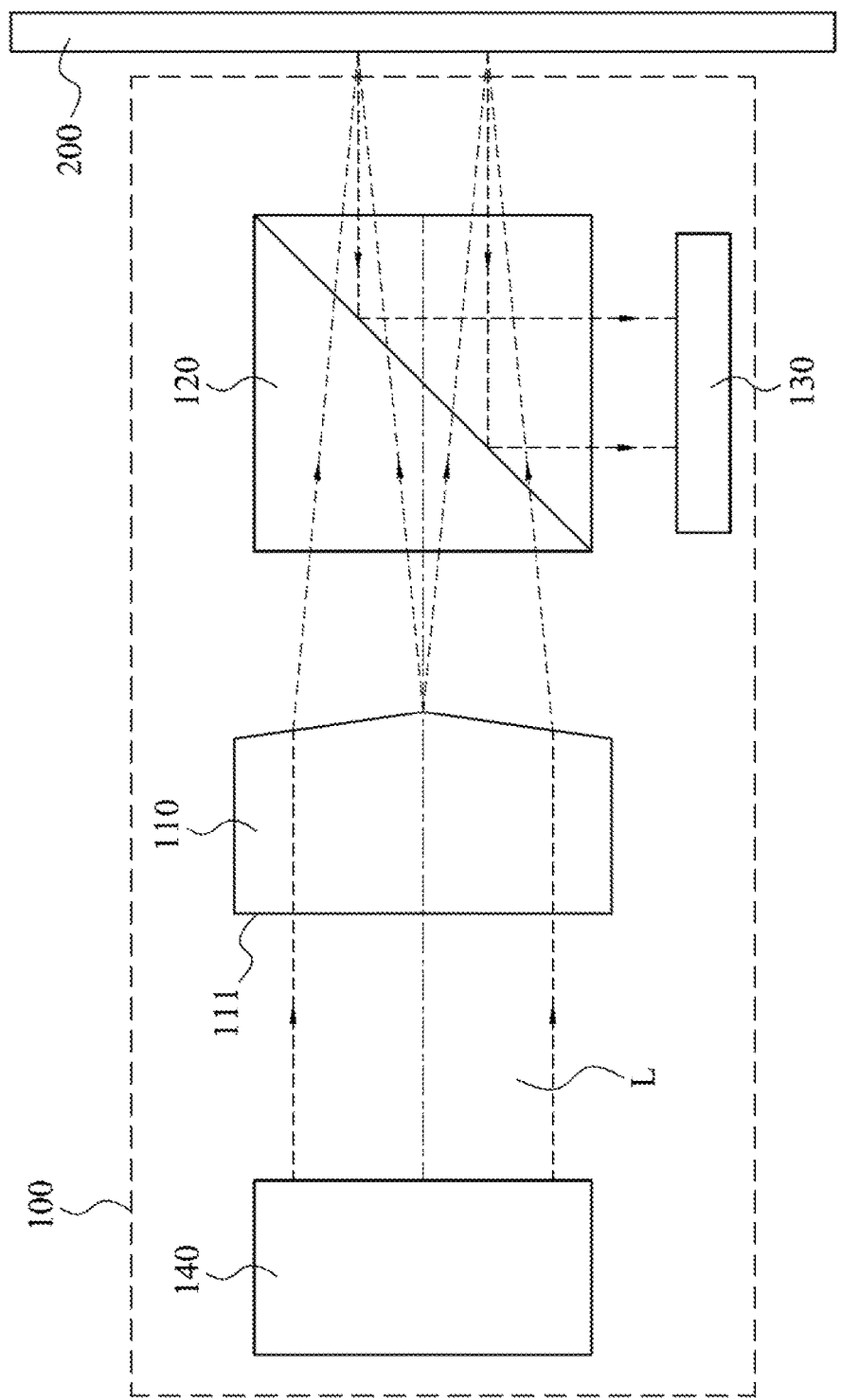
FIG. 2 is a schematic diagram of an optical device according to another embodiment of the present disclosure.

Reference is made to FIG. 2. FIG. 2 is a schematic diagram of an optical device 100 according to another embodiment of the present disclosure. As shown in FIG. 2, according to the actual conditions, for example, under the condition that the wavelength of the light beam L as emitted from the light source 140 to the first light-incident surface 111 is long enough, or the pitch of the microstructure on the surface of the grating 200 is short enough, the first light-incident surface 111 of the prism 110 can be disposed as a single flat surface, such that the structure of the prism 110 can be further simplified.

Figure 3:
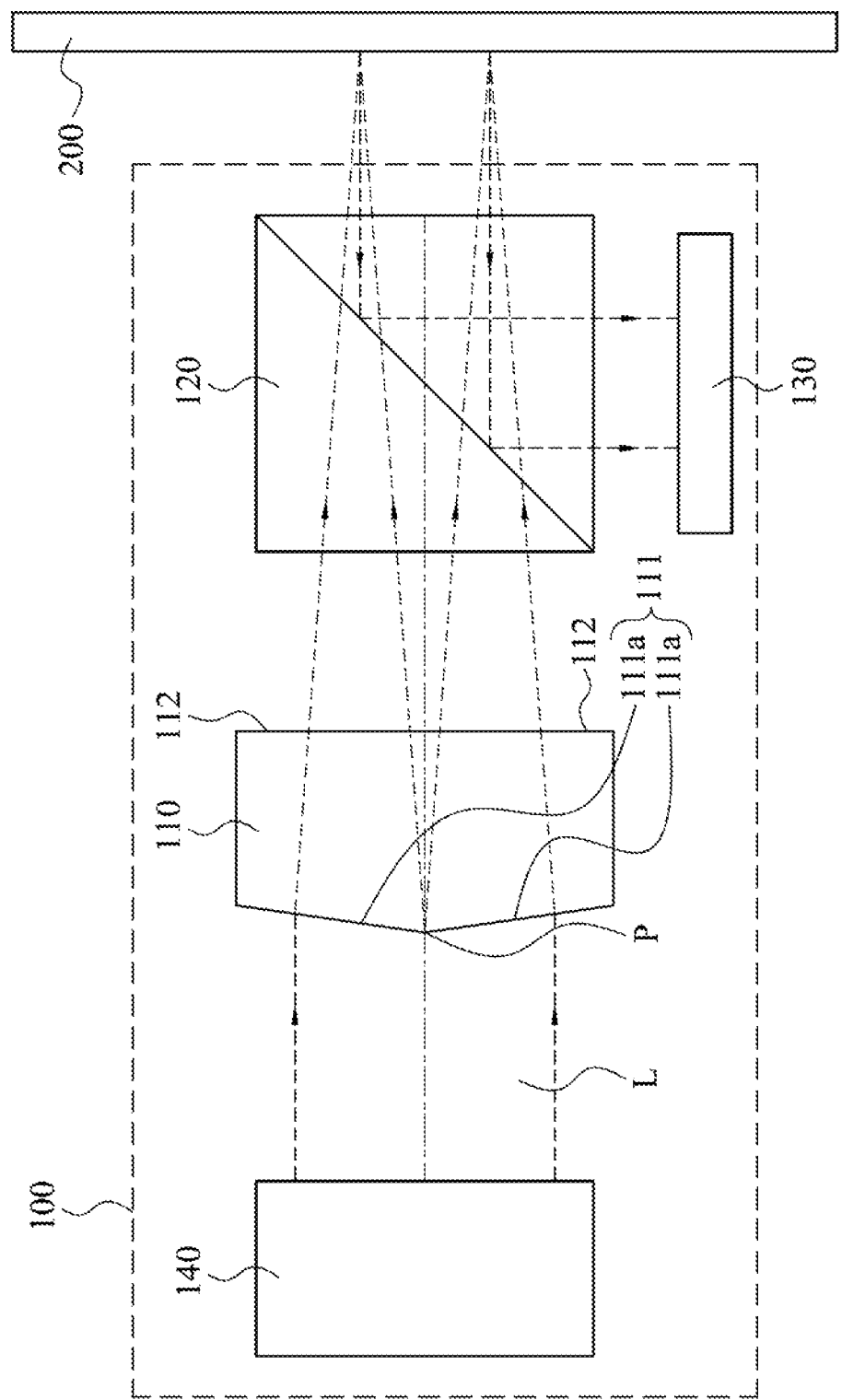
FIG. 3 is a schematic diagram of an optical device according to a further embodiment of the present disclosure.

Reference is made to FIG. 3. FIG. 3 is a schematic diagram of an optical device 100 according to a further embodiment of the present disclosure. As shown in FIG. 3, according to the actual conditions, for example, the first light-transmitting surfaces 112 are designed to be of the same plane such that the vertex V is disappeared as compared to previous embodiments. Moreover, the subsidiary light-incident surfaces 111a of the first light-incident surface 111 are mutually connected and intersect at a protruding angle P to form together a protruding shape, such that the protruding angle P is more than 180 degree outside the prism 110. In this way, the prism 110 is in a Δ shape.

In conclusion, when compared with the prior art, the embodiments of the present disclosure mentioned above have at least the following advantages:

(1) Since each of the first light-transmitting surfaces of the prism is substantially a flat surface, and the first light-incident surface can include a plurality of subsidiary light-incident surfaces, in which the subsidiary light-incident surfaces are mutually connected and intersect at the recessed angle less than 180 degree outside the prism, as compared with a lens with a curved light-incident surface and a curved light-transmitting surface, the structure of the prism is simple and is easy to be manufactured. Furthermore, the prism can include a transparent material against the light beam, such as acrylic. Thus, the production cost of the prism can be reduced. Consequently, the overall cost of the optical device can be effectively reduced.

(2) Because of the simple structure of the prism, the installation and adjustment of the prism in the optical device becomes simple and easy. Thus, the overall cost of the optical device is further reduced effectively.

Although the present disclosure has been described in considerable detail with reference to certain embodiments thereof, other embodiments are possible. Therefore, the spirit and scope of the appended claims should not be limited to the description of the embodiments contained herein.

It will be apparent to the person having ordinary skill in the art that various modifications and variations can be made to the structure of the present disclosure without departing from the scope or spirit of the present disclosure. In view of the foregoing, it is intended that the present disclosure cover modifications and variations of the present disclosure provided they fall within the scope of the following claims.

What is claimed is:

1. An optical device configured for measuring a distance, comprising:
   a prism having a first light-incident surface and a plurality of first light-transmitting surfaces, the first light-incident surface being disposed opposite to the first light-transmitting surfaces, the first light-transmitting surfaces being mutually inclined and intersecting at a vertex;

a beam splitter having a light-passing surface, and a second light-incident surface and a second light-transmitting surface mutually connected, the second light-incident surface at least partially facing to the first light-transmitting surfaces, the light-passing surface being disposed opposite to the second light-incident surface, the beam splitter further comprising a partially mirror surface therein, the partially mirror surface at least partially facing to the light-passing surface and the second light-incident surface, the light-passing surface being configured to face to a grating;

a detector corresponding to the second light-transmitting surface; and a light source configured to emit a light beam to enter into the prism through the first light-incident surface, an optical axis of the light beam passing through the vertex and the beam splitter, the first light-transmitting surfaces being configured to retract the light beam away the prism.

2. The optical device of claim 1, wherein the vertex is away from the light source.

3. The optical device of claim 1, wherein each of the first light-transmitting surfaces is substantially a flat surface.

4. The optical device of claim 1, wherein the light source, the vertex and the beam splitter are substantially aligned in a straight line.

5. The optical device of claim 1, wherein the first light-incident surface comprises:

a plurality of subsidiary light-incident surfaces mutually connected and intersecting at a recessed angle less than 180 degree outside the prism.

6. The optical device of claim 5, wherein the subsidiary light-incident surfaces form together a recessed shape and the first light-transmitting surfaces form together a protruding shape, such that the prism is in a V shape.

7. The optical device of claim 1, wherein the first light-incident surface comprises:

a plurality of subsidiary light-incident surfaces mutually connected and intersecting at a protruding angle more than 180 degree outside the prism.

8. The optical device of claim 7, wherein the subsidiary light-incident surfaces form together a protruding shape and the first light-transmitting surfaces are of a same plane, such that the prism is in a Δ shape.

9. The optical device of claim 1, wherein the second light-transmitting surface and the light-passing surface are mutually connected.

10. The optical device of claim 1, wherein the prism comprises a transparent material against the light beam.

11. The optical device of claim 1, wherein the light source is configured to emit a coherent light.

12. The optical device of claim 1, wherein the light beam refracted by the first light-transmitting surfaces forms at least two refracted light beams, such that an angle between the refracted light beams after refracted by each of the first light-transmitting surfaces is equal to an integer multiple of a ratio of a wavelength of the light beam to a pitch of the grating.

13. The optical device of claim 1, wherein the prism locates between the light source and the beam splitter.

14. The optical device of claim 1, wherein an angle between a normal of the first light-incident surface and a normal of each of the first light-transmitting surfaces is in a range between 0 degree and 90 degree.

* * * * *